Jan. 26, 1954  K. W. McLOAD  2,667,531
SWIVEL COUPLING FOR SEISMIC SURVEYING SYSTEMS
Filed Dec. 27, 1949  2 Sheets-Sheet 1
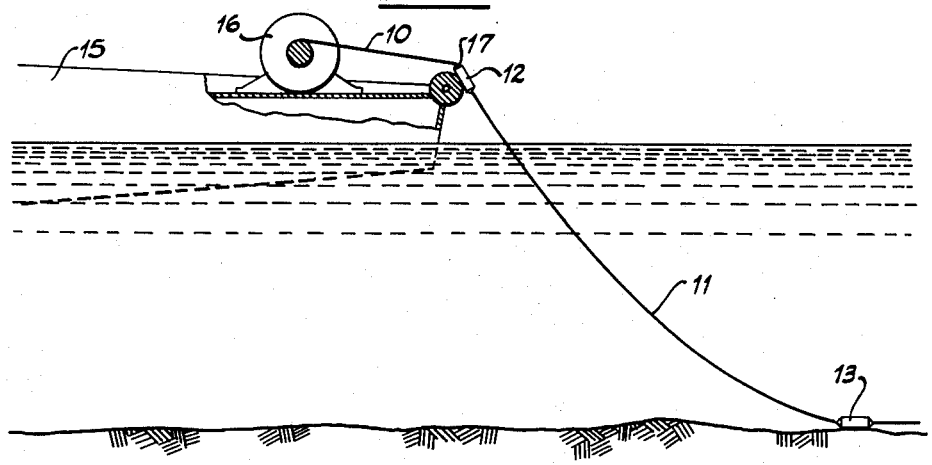
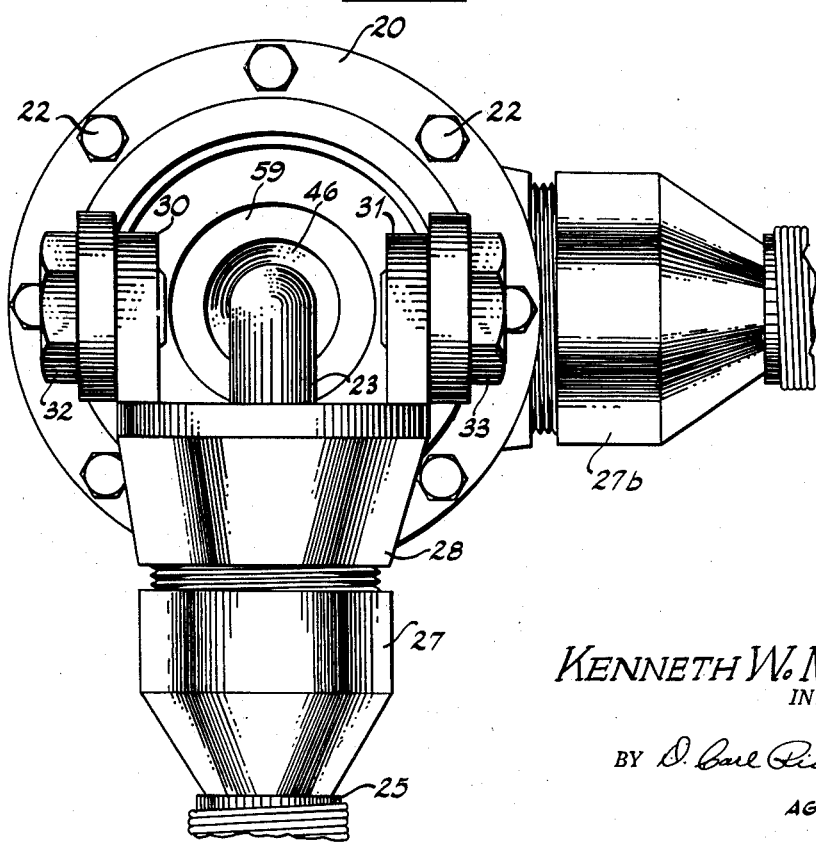
KENNETH W. McLOAD
INVENTOR.
BY
AGENT Jan. 26, 1954 K. W. McLOAD 2,667,531
SWIVEL COUPLING FOR SEISMIC SURVEYING SYSTEMS
Filed Dec. 27, 1949 2 Sheets-Sheet 2

KENNETH W. McLOAD
INVENTOR.

BY D. Carl Richards
AGENT

Patented Jan. 26, 1954

2,667,531

UNITED STATES PATENT OFFICE 2,667,531

SWIVEL COUPLING FOR SEISMIC SURVEYING SYSTEMS

Kenneth W. McLoad, Dallas, Tex., assignor, by mesne assignments, to Socony-Vacuum Oil Company, Incorporated, New York, N. Y., a corporation of New York Application December 27, 1949, Serial No. 135,091

5 Claims. (Cl. 174—70)

1

This invention relates to seismic exploration systems for underwater surveying and more particularly to means for interconnecting seismic detectors and associated cable sections in avoidance of placing undue stress due to abrupt bending on the electrical conducting means of the cables.

Extensive use has been made of elongated cables comprised of alternately spaced seismic detectors or geophones and cable sections which may be towed through the water along the water bed to plant the geophones at selected locations for the detection of seismic waves. Provision has been made whereby the geophones automatically orient themselves for proper phasing of the signals received at a plurality of points. Such apparatus has solved many of the complex problems arising from the transfer of seismic operations from land to areas inundated by water. However, manipulation of cable apparatus such as in paying it out from a boat and reeling it in to a boat results in undue stress and consequent mechanical working of the electrical conductors to the extent that at vulnerable points the electrical conductor means in the cable are fatigued and ultimately break leaving open circuits which are expensive to repair and incur considerable delay in the seismic operation in removal of defective units from the apparatus for replacement by operative units. The most vulnerable spot for such detrimental action is at the point the flexible cable enters the rigid geophone housing.

In accordance with the present invention a geophone cable assembly is provided which comprises cable sections and geophones disposed between adjacent cable sections with a pivotal structure interconnecting the juxtaposed ends of a cable section and a geophone for relative pivotal movement about an axis extending transversely of the cable section for increased flexibility adjacent the geophones. In a preferred form of the invention, the cable assembly is made watertight by sealing means inclosing the cable on either side of the pivotal structure.

For further objects and advantages of the present invention and for a more complete description thereof, reference may now be had to the following description taken in conjunction with the accompanying drawings in which:

Figure 1 illustrates the use of the seismic surveying apparatus in underwater exploration;

2

Figure 2:
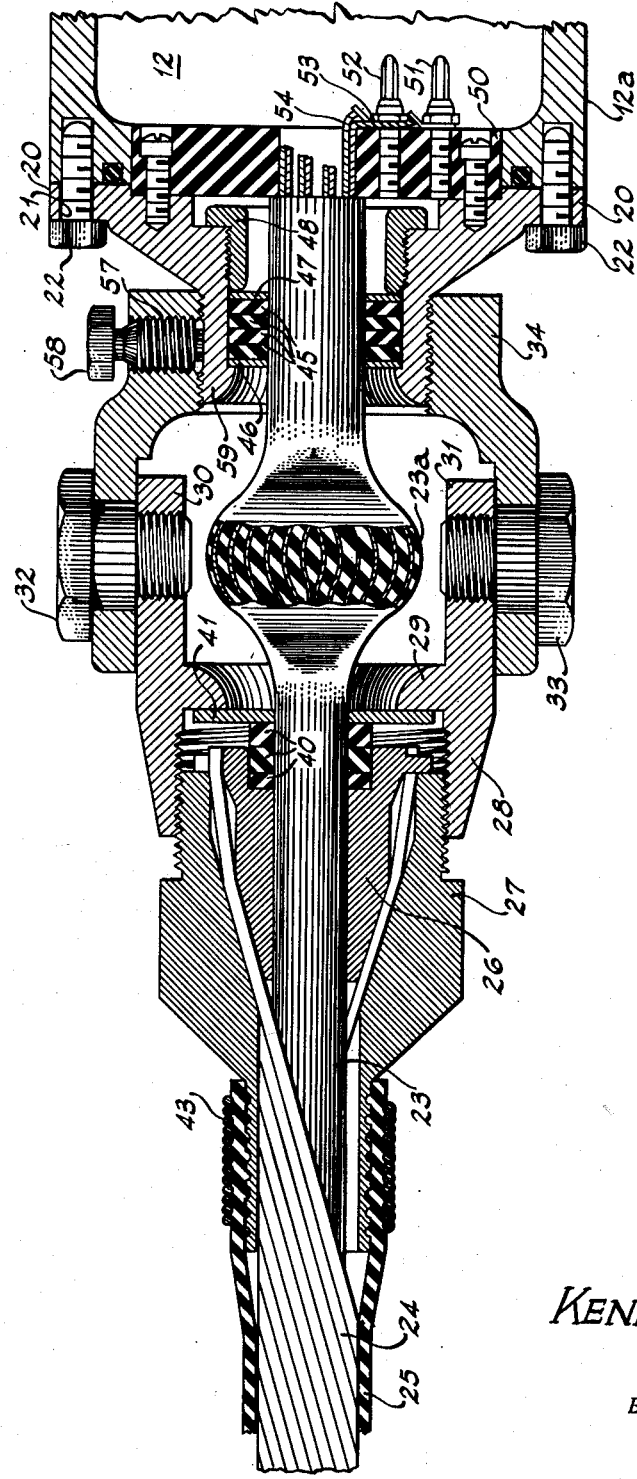
Figure 2 is a sectional view of the cable terminating means.

Figure 3 is an end view of a geophone with the cable end members attached thereto with their pivotal axes at a relative angle of 90°.

Referring to Figure 1, a portion of the seismic surveying apparatus comprised of cable sections 10 and 11 interconnecting in an end to end relation geophones 12 and 13 is illustrated in one position encountered in the laying out of a spread of geophones from a boat 15. A serious problem is presented by the mechanical working of the cable at the extreme or abrupt bend in the cable section 10 at its junction with the geophone 12. In marine operations, it is expedient to treat the apparatus as a unitary cable which may be reeled to or from a drum 16 mounted on the boat 15. Although the cable itself has sufficient flexibility as to be wound on the drum or reel 16, the geophones even with couplings of minimum length represent a rigid structure which is too long for use with a reel of the size that may be carried by geophysical boats. More particularly, when a geophone is wound onto a reel, the angle between the geophone axis and a tangent (cable section 10) to the reel from the end of the geophone produces a much sharper bend in the cable than can be tolerated. In general, any manipulation of the seismic cable other than an axial towing force will cause bending where the flexible cable enters the geophone. For example, in dropping the cable over the side of the boat 15, such an abrupt bend often occurs in the cable at point 17 as to produce stress on the conducting members of the cable of such magnitude that after a number of such operations the conductors may become fatigued and rupture to open the circuit and render the apparatus inoperative.

Referring now to Figure 2, an end connecting member (illustrated in section) reduces to a minimum the stress producing mechanical working of the electrical conductors. More specifically, a flanged coupling 20 provided with holes about the periphery thereof is adapted to be secured by bolts 22 threadedly engaging the juxtaposed end of an associated geophone 12 comprised of a detector unit (not shown) to be mounted in a cylindrical housing 12a. The tensional forces exerted on the cable by the towing thereof are transmitted to the geophone through the flanged anchoring member 20. The cable section includes a plurality of conductors encased in a rubber sheath 23. A plurality of tension-bearing cable members 24 are laid around the rubber sheath 23 to withstand the tensional forces and protect the conductors in the sheath 23. An additional rubber sheath 25 has been illustrated as encasing the tension-bearing elements 24.

For the transmission of tensional forces to the flanged member 20, each of the members 24 is welded to or otherwise fastened at the end of a terminating cone 26. The cone 26 is then fitted into a complementary jacket or ferrule 27 which is of relatively small internal diameter at one end for entry of the conductors and tension-bearing members. The rubber sheath 25 is threaded over the extension of the tubular portion 27a of the ferrule 27. The other end of the ferrule 27 is threaded and is received by the threaded end of a yoke or nut 28 provided with an internal shoulder 29 which bears against the end of the cone 26 when served fully onto the ferrule 27. When positioned as illustrated in Figure 2, the force exerted between the cone 26 and the ferrule 27 on the tension-bearing members 24 frictionally anchors them for transmission of forces to the yoke 28. The yoke 28 is provided with two extension ears 30 and 31 which are bored along a line which is oriented perpendicular to the axis of the cable or ferrule 27. The extensions 30 and 31 are tapped to receive studs 32 and 33 respectively. The studs 32 and 33 pass through the clevis portion of a complementary yoke 34 which threadedly is fastened to the flange 20. Thus, the forces exerted on the tension-bearing members 24 are transferred through the cone 26 and ferrule 27 to the yoke 28 thence to the studs 32 and 33 to the yoke 34 and then to the flange 20. It is to be understood that with flange 20 fastened to one end of a geophone, a similar flange on the end of a succeeding cable section will be fastened to the other end of a geophone in a watertight manner to prevent entry of such liquids as would short out the electrical circuits therein.

The electrical conductors encased in the sheath 23 extend axially through the ferrule 27 and the cone 26 which is center bored, and into the area between the yokes 28 and 34. Since it is preferred to have the cable section itself watertight to minimize leakage, a packing gland is provided where the electrical conductors emerge from the cone 26. More particularly, three rubber washers 40 are placed around the sheath 23 and fitted into a re-entrant opening in the cone 26. A pressure plate 41 also fitted over the sheath 23 bears against the shoulders 29 to compress the washers 40 down onto the sheath 23 to effect a watertight seal and thus prevent water or liquid from flowing into the cable. The wire or other binding means 43 is provided to insure that the connection between the outer sheath 25 and the tubular end of the ferrule 27 is watertight.

The electrical conductors emerging from the pressure plate 41 extend past the axis of studs 32 and 33 to the central channel in the flange 20 where a second packing gland seals the geophone from entry of water. More particularly, rubber washers 45 encircling the sheath 23 are placed under compression between metallic washers 46 and 47 by a packing gland nut 48.

An insulating disc 50 is provided with a plurality of plugs including the plugs 51 and 52 to which the electrical conductors housed in the sheath 23 are terminated. A plurality of jacks (not shown) carried by the housing 12a receive the plugs 51 and 52. As illustrated in Figure 2, two of the conductors, the conductors 53 and 54, are individually terminated at the plugs 51 and 52 respectively. As disclosed in applicant's copending application Serial No. 14,115, filed March 10, 1948, now Patent No. 2,590,531, dated March 25, 1952, the plugs 51 and 52 serve to complete the circuit from the cable sections to conductors extending through the geophone to further cable sections.

The terminating member illustrated in Fig. 2 and above described, provides a pivot comprised of the swivel bolts 32 and 33 for rotational movement of the cable section with respect to the geophone about an axis which is perpendicular to the axis of the geophone. The radius of curvature of the conductors is determined by the distance between the washers 41 and 46, since the packing glands, mechanically speaking, form cantilever supports for the cable extending therefrom. This radius of curvature is controlled so that stresses on the conductors due to bends in the cable as great as 90° are so small as to have little or no effect on the life of the cable. A means of further minimizing the stress is illustrated in Fig. 2 and consists in laying the various conductors housed in the sheath 23 side by side in the area 23a (shown in section) adjacent the pivotal axis and vulcanizing them in their side by side relation in a rubber mass to form a flat tapelike section one conductor thick for at least a short section where the conductors may freely bend.

As disclosed in applicant's above-identified Patent No. 2,590,531, the flange 20 is required to be fastened to the end of the geophone in any one of a plurality of positions for connection of the associated detectors properly to select the pairs of conductors. By this means, signals generated in the several geophones in a spread may be separately transmitted to the recording apparatus carried by the associated boats. In assembling the cable apparatus, it may be necessary to fasten the flange 20 to the geophone in a first position and a second flange to the other end of the geophone in a second position such that the axes of the pivots of the two end connecting members are separated by a relative angle as great as 90°. Such a connection has been illustrated in Figure 3, which is an end view of a cable geophone similar to Figure 2 except that the cable is not moulded or flattened at the pivotal axis. An angle of 90° is the maximum possible separation between the pivotal axes adjacent the geophone ends, and in this position and even lesser angles, the cable will still be subject to abrupt bending at at least one end of the geophone. Consequently, it is necessary that the two pivotal axes at the ends of a given geophone lie in substantially the same plane if stress on the conductors is to be avoided. Accordingly, means are provided to adjust the relative angular position of the two pivotal axes after the flanges 20 have been fastened to the respective ends of a geophone.

The foregoing is illustrated in Figure 2 wherein the yoke 34 is threadedly secured to the flange 20 and a hole 57 is drilled through the threaded portion of the yoke 34 with a stud 58 threadedly fitted therein. A channel is milled in the threaded extension 59 of the flange 20 to the depth of the threads and extends at least through 90° of the periphery of the threaded extension 59. Thus, when the flange 20, Figure 3, and a similar flange carrying the ferrule 27b are fastened to a geophone housing with the pivotal axes in different planes, the stud 58, Figure 2, and a similar stud associated with both of the end connecting ferrules may be loosened and the ferrules 27 and 27b rotated until their axes lie in the same plane. Thereupon, the studs may be tightened to maintain the desired relative angular position.

When the two pivotal axes lie in the same plane, the cable may be wound upon a drum or pulled over the side of a boat such as illustrated in Figure 1 without producing an abrupt damaging bend in the cable section. The cable assembly comprising the cable sections and geophones interconnected has an increased flexibility adjacent the juxtaposed ends of the cable sections and geophones for the often-required pivotal movement or bending in the manipulation of the unit in placing it in position for reception of seismic waves.

While the invention has been illustrated and described with such particularity as to enable one skilled in the art to make and use the same, it will be understood that further modifications may now suggest themselves to those skilled in the art, and it is intended to embrace such modifications as fall within the scope of the invention by the appended claims.

What is claimed is:

1. In a seismic surveying system, the combination of a plurality of geophones, cable sections having tension bearing means and electrical conducting means therein interconnecting said geophones in a predetermined spaced apart relation, means for minimizing stresses on said conducting means due to bending at the entry thereof into each of said geophones comprising an anchoring member for each cable section mechanically terminating its said tension bearing means and having a channel centrally thereof through which its said conducting means pass, a second anchoring member adapted to be fastened to each of said geophones in any of a plurality of different angular positions and having means for terminating said conducting means, pivot means between said anchoring members on a line normal to the axis of said cable by which said members are coupled and about which said cable adjacent the ends of each said geophone may bend, sealing means cooperating with each said conducting means to form watertight seals at the entry of said conducting means into both of said anchoring members, and means for rotating each said pivotal axis at least through one quadrant independently of said second named anchoring member in a plane normal to the axis of the geophone to which said second member is fastened.

2. In combination with a multiconductor cable having a strength element apart from the conductors thereof, of means for minimizing stresses at the termination of conductors of said multiconductor cable comprising a first anchoring member having structure to which said strength element is secured and having a bore through which said conductors extend, a second anchoring member having terminal means disposed in a fixed geometrical relation and connected to said conductors, an intermediate element between said anchoring members characterized by a connection to said first anchoring member providing large radius bending of said cable about an axis normal to the length of said bore and a rotatable connection to said second anchoring member for rotation of said axis into a selected position while maintaining fixed said geometrical relation of said terminal means and said conductors, and means for securing said intermediate member to said second anchoring member in said selected position.

3. In an underwater seismic surveying system, the combination of a plurality of geophones, sectionalized cable sections respectively including electrical conducting means and tensional means with strength apart from said conducting means for interconnecting said geophones, a first anchoring member for each said geophone to which one of said tensional means is secured and beyond which said conducting means extend, a second anchoring member for each said geophone adapted to be secured to it and having means for terminating said conducting means, means for coupling said anchoring members for pivotal movement therebetween about a pivotal axis normal to the longitudinal axis of said geophone to which said second member is anchored for transmission of tension forces from said tensional means to said geophone and for relatively large radius bending of said conducting means between said anchoring members, and an angularly adjustable connection between said coupling means and said second anchoring member for adjusting the angular position of said coupling means in a plane normal to said longitudinal axis independent of the angular orientation of said second anchoring member relative to the geophone to which it is attached.

4. In a seismic surveying system, the combination of a plurality of geophones each including a rigid housing, cable sections having tension bearing means and electrical conducting means therein interconnecting said geophones in a predetermined spaced apart relation, cable end members for said cable sections adapted to be attached respectively to opposite ends of each said geophone housing in any one of a plurality of positions of different angular rotation about the longitudinal axis of said geophone housing, means carried by said cable end members for terminating said electrical conducting means of the respective cable sections, anchoring members for said tension bearing means of said cable sections respectively positioned at points spaced from the respective ends of said geophone housing beyond said cable end members, means for coupling said cable end members to said anchoring members for transmission of drag forces in said cable sections through each of said geophone housings, each said coupling means having pivotal structure which establishes bending of said conducting means about a pivotal axis normal to the longitudinal axis of the geophone housing, and each said coupling means being angularly adjustable about said longitudinal axis relative to said cable end members to bring the pivotal axes at the respective ends of said geophone housing into the same plane with said cable end members fastened to said geophone housing in any selected angular position.

5. Means for minimizing stresses at the termination of conductors of a multiconductor cable which has a strength element apart from said conductors, comprising a first anchoring member having structure to which the strength element of a cable may be secured and having a bore through which conductors of such a cable may extend, a second anchoring member including terminal means for terminating cable conductors in a fixed geometrical relation with respect to said second member, means interconnecting said anchoring members and including structure forming a pivotal axis normal to the length of said bore for pivotal movement about said axis of said anchoring members, and said interconnecting means having additional structure for rotation of said pivotal axis with respect to said terminal means.

KENNETH W. McLOAD.

References Cited in the file of this patent

UNITED STATES PATENTS

| Number | Name | Date |
|---|---|---|
| 2,083,937 | Begg | June 15, 1937 |
| 2,129,540 | Van Billiard | Sept. 6, 1938 |
| 2,306,331 | Elmer | Dec. 22, 1942 |

FOREIGN PATENTS

| Number | Country | Date |
|---|---|---|
| 293,952 | Great Britain | July 19, 1928 |
| 367,949 | Great Britain | Mar. 3, 1932 |
| 707,434 | France | July 8, 1931 |